3,083,708
SLEEVE OR LEGGING FOR STIMULATING FLOW OF FLUIDS WITHIN AN ANIMAL BODY
Max Gottfried, Toledo, Ohio, assignor to The Jobst Institute, Toledo, Ohio, a corporation of Ohio
Filed Aug. 8, 1960, Ser. No. 48,066
5 Claims. (Cl. 128—39)

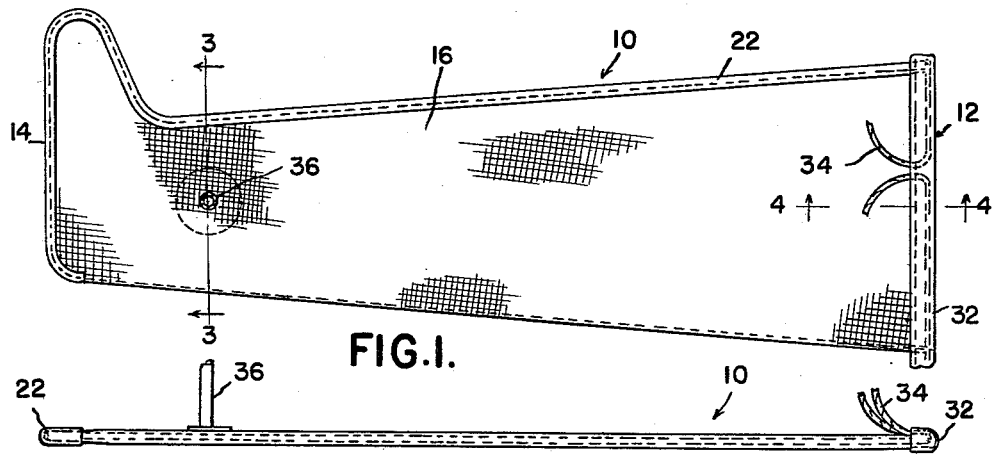
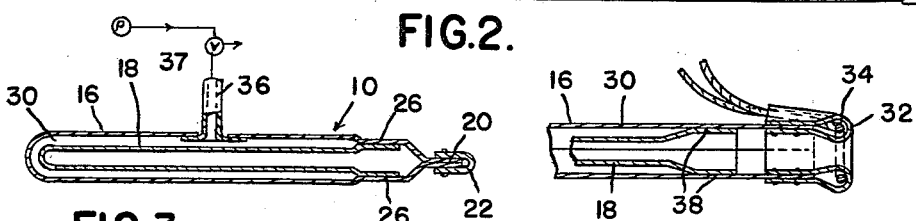
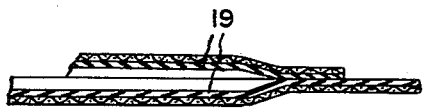
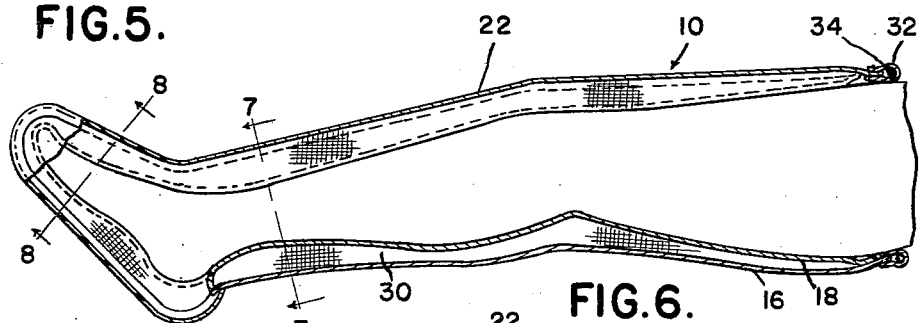
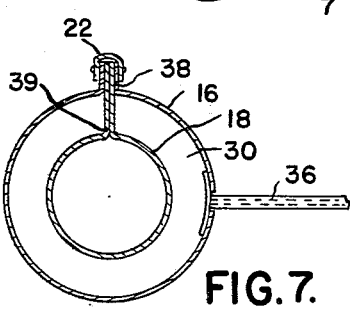
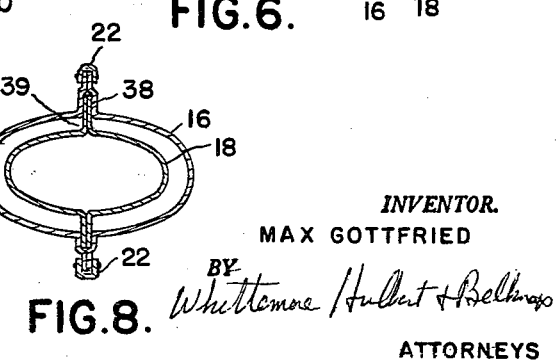

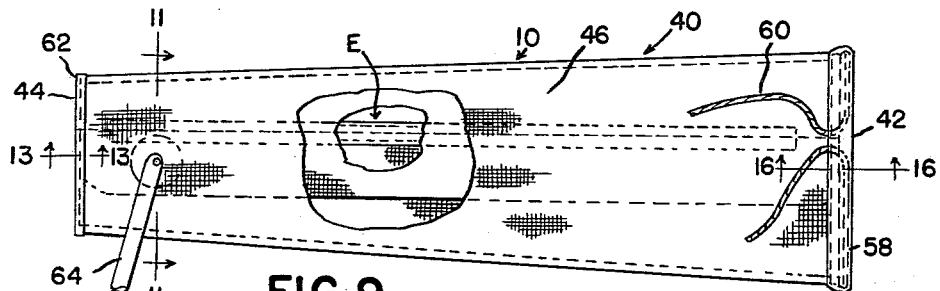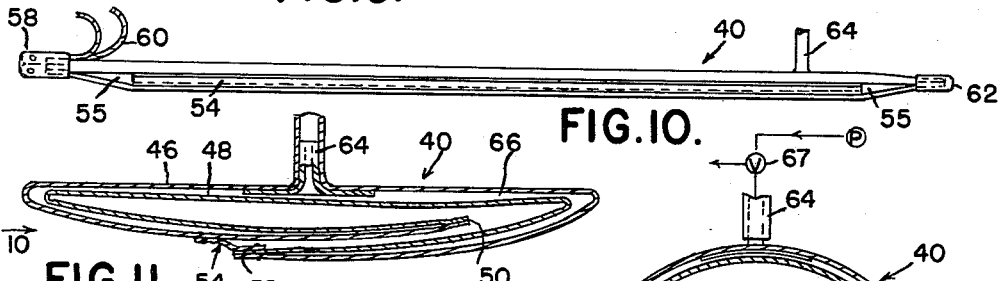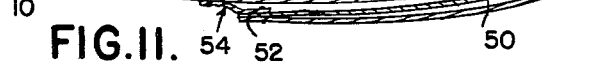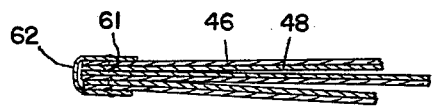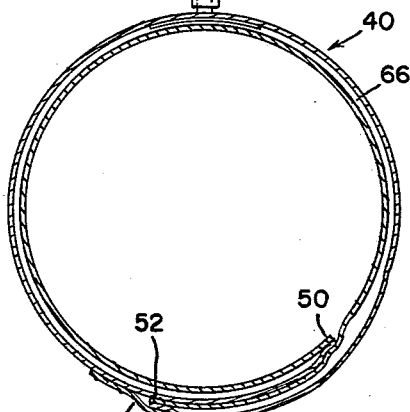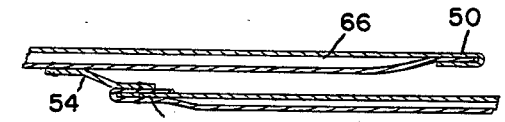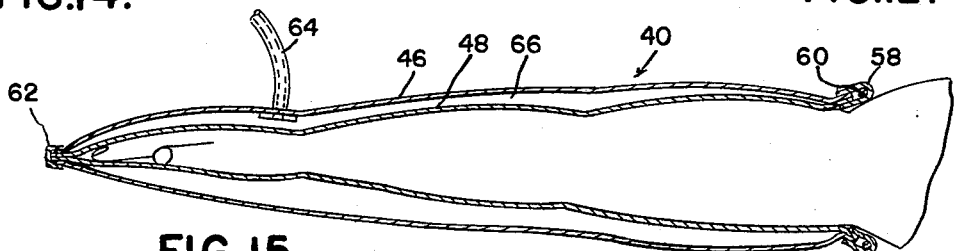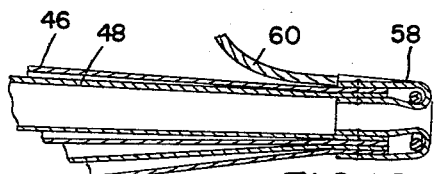

This invention relates to a method of and means for stimulating flow of fluids in an animal body.

In a normal state of health and activity venous flow is largely due to alternating contraction and relaxation of the muscles in the vicinity of the veins. The veins have one-way valves which permit the flow of blood therethrough in the direction of the heart but prevent reverse flow. However, in the case of impaired health, these valves cease to function properly with a resultant stagnation of the flow. What has been said about venous circulation is also true of the lymphatic fluid which requires a degree of muscular activity to insure proper functioning.

One object of this invention is to provide an improved method of and means for stimulating venous and lymphatic flow in a body, as for instance a patient recovering from an operation.

Another object of the invention is to provide a method of stimulating flow within an animal body extremity which comprises intermittently subjecting the entire extremity to a uniform pressure to produce an equal radially inwardly directed pressure on all parts of the extremity simultaneously.

Another object of the invention is to provide a means for stimulating flow within an animal body extremity which comprises an elongated envelope having inner and outer members defining an elongated substantially annular space and adapted to fit about the body extremity with the inner member in contact with the body extremity to surround the same and extend longitudinally thereof, and means for admitting fluid pressure to the space between the members and alternately releasing the pressure to intermittently contract the inner member and produce a radially inwardly directed pressure against the body extremity. The annular space is preferably continuous and uninterrupted and embraces substantially the entire body extremity to apply a uniform pressure simultaneously on all portions thereof.

Other objects and advantages of the invention will become apparent as the following description proceeds, especially when considered with the accompanying drawings, wherein:

FIG. 1 is a side elevational view of an envelope designed to fit the leg and foot of a human body to be used to stimulate the return flow of fluid therein, constructed according to my invention.

FIG. 2 is an edge view of the envelope shown in FIG. 1.

FIG. 3 is a sectional view taken on the line 3—3 of FIG. 1.

FIG. 4 is a fragmentary sectional view taken on the line 4—4 of FIG. 1.

FIG. 5 is an enlargement of a portion of FIG. 3.

FIG. 6 is a longitudinal sectional view of the envelope shown in FIG. 1, applied to the leg and foot of a patient.

FIG. 7 is a sectional view taken on the line 7—7 of FIG. 6, showing a slightly modified construction.

FIG. 8 is a sectional view taken on the line 8—8 of FIG. 6, showing another section of the modified construction.

FIG. 9 is a side elevational view of an envelope having a modified construction, designed particularly to stimulate flow in the arm and hand of a patient.

FIG. 10 is an edge view of the envelope shown in FIG. 9, looking in the direction of the arrow 10 in FIGS. 9 and 11.

FIG. 11 is a sectional view taken on the line 11—11 of FIG. 9.

FIG. 12 is similar to FIG. 11 but shows the envelope inflated.

FIG. 13 is a fragmentary sectional view taken on the line 13—13 of FIG. 9.

FIG. 14 is a fragmentary sectional view showing a slightly modified form of a portion of FIG. 11, on an enlarged scale.

FIG. 15 is a longitudinal sectional view showing the sleeve applied to the arm of a patient.

FIG. 16 is a fragmentary sectional view taken on the line 16—16 of FIG. 9.

Referring now more particularly to the drawings and especially to FIGS. 1–6 thereof, the means for stimulating flow within a body extremity is shown as comprising an elongated envelope 10 which is open at one end 12 for the insertion of the extremity and closed at the opposite end 14. The envelope is designated to receive the leg and foot of a patient being treated, and accordingly has a suitable outline for this purpose.

The envelope is made up of an outer member 16 and an inner member 18. The inner and outer members are formed of any suitable material, preferably a non-elastic, flexible fabric such as silk or nylon coated on one side with an air impermeable substance 19, such as rubber or neoprene. The outer member 16 is a continuous piece of material which is folded on itself and stitched together to provide a longitudinal seam 20. The seam 20 extends from the open end of the envelope longitudinally along the front thereof continuously across the toe and along the bottom of the foot portion, terminating at the heel. An elongated cover strip 22 is provided which extends along the seam and is stitched thereto. Preferably, where the marginal portions of the outer member are pressed together at the seam they are cemented to form a seal.

The inner member 18 is substantially co-extensive with the outer member and also is shaped to receive the leg and foot of a patient being treated, with negligible pressure thereon. The inner member is also longitudinally split and the longitudinal marginal edge portions thereof are cemented to the outer member as indicated at 26. The cementing together of the inner and outer members extends from the open end of the envelope continuously and co-extensively with the seam 20. The inner and outer members cooperate to provide a continuous substantially annular chamber 30 which extends about all portions of the extremity inserted within the envelope except for a small distance to either side of the seam. The rubberized surfaces 19 of the members are on the inside to prevent the escape of air from the chamber.

Referring to FIGS. 1 and 4, it will be noted that an annular cover strip 32 is provided at the upper end of the envelope which is folded on itself and stitched to the inner and outer surfaces of the outer member 16 around the entire periphery thereof. The cover strip defines an annular space for the cord 34, the ends of which project through a space in the stitching so that the open end can be pulled tight and tied. A charging stem 36 is carried by the outer member and extends outwardly therefrom, being in communication with the space 30 between the members for charging the space with air under pressure. Any suitable source of air pressure P may be employed, controlled by the valve diagrammatically shown at 37 for alternately placing the pressure source in communication with the space and releasing the pressure therein.

The inner and outer members are cemented at the top, at 38, to seal the chamber.

In use, the leg and foot of the patient being treated is inserted as in FIG. 6, and air under pressure is admitted to the space 30 between the inner and outer members to produce a radially inwardly directed pressure against the body extremity. The space 30 is continuous and uninterrupted and embraces substantially the entire body extremity, with the exception of the narrow space which follows along the length of the seam 20, to apply a uniform pressure simultaneously to all portions of the extremity. The pressure is alternately applied and released to stimulate flow.

FIGS. 6, 7 and 8 illustrate a slightly modified construction in which the longitudinal margins 38 of the inner member are cemented together and extend between the marginal portions of the seam of the outer member. The margins of the inner member are cemented together for a considerable extent radially inwardly of the seam, as illustrated at 39. According to this construction, the area or extent of the extremity which is not subjected to the fluid pressure is minimized. Otherwise, the construction is as in FIGS. 1–6.

Referring now more particularly to the embodiment shown in FIGS. 9–16, the envelope there shown is indicated generally at 40 and, as will be apparent, is designed particularly for treatment of the hand and arm of a patient. The envelope is open at the end 42 and closed at end 44, and comprises an outer member 46 and an inner member 48. The inner and outer members are formed of the same material as in FIGS. 1–8, with the rubberized surface on the inside.

Both the inner and outer members are longitudinally split throughout their full length, and as shown in FIG. 11. One longitudinal margin of the inner member is cemented and stitched to the corresponding margin of the outer member as indicated at 50, while the other margin of the inner member is cemented and stitched to the corresponding margin of the outer member as indicated at 52. The marginal portions may be cemented and stitched together in simple surface-to-surface relation as in FIGS. 12 and 13, or one margin may be folded over the other and cemented and stitched as in FIG. 14. The pairs of cemented and stitched marginal portions overlap one another, as will be apparent in FIG. 11. The pair of marginal portions 52 are secured to the outer surface of the other pair of portions by the longitudinal strip 54 stitched thereto. The strip 54 terminates short of the ends to provide slots 55 open to the space within the sleeve. The envelope is shown in expanded condition in FIG. 12. The FIG. 12 construction differs slightly in that strip 54 is secured to the outer surface of the overlapping marginal portions 52.

At the open end of the envelope, the inner and outer members are cemented and stitched together along their margins and an annular cover strip 58 is folded over the cemented and stitched together margins and provides an annular space for a drawstring 60, the ends of which protrude from an unstitched portion of the cover strip. Thus, the open end of the envelope may be drawn about the arm of the patient and tied. At the closed end, the marginal portions of the inner and outer members are cemented and stitched together at 61 and a cover strip 62 is provided.

A charging tube 64 is secured to the outer member 46 in communication with the space 66 defined between the inner and outer members. As in FIGS. 1–8, any suitable source of air pressure may be employed, as P, controlled by the valve diagrammatically shown at 67 for alternately placing the pressure source in communication with the space and releasing the pressure therein.

As seen particularly in FIGS. 11 and 12, the limb that is to be inserted into the envelope will be subjected to the fluid pressure admitted to the sleeve throughout the entire circumference thereof, due to the overlap provided between the marginal portions of the members.

In use, the hand and arm of the patient is inserted within the envelope as shown in FIG. 15, and air under pressure is admitted to the annular chamber 66 to produce a radially inwardly directed pressure against the arm and hand. Since the space is continuous and uninterrupted and embraces the entire hand and arm, a uniform pressure is applied simultaneously on all portions thereof. The pressure is alternately applied and released to stimulate flow.

The recommended procedure in treating an arm or leg of a patient with either the envelope 10 or the envelope 40 is to apply pressure to the chamber within the envelope and alternately release the pressure to intermittently contract the inner member and produce the radially inwardly directed pressure. In the intervals between application of the fluid pressure, the inner member of the envelope, while snugly fitting the body extremity, imposes only negligible, if any, pressure thereon.

What I claim as my invention is:

1. Means for stimulating flow within an animal body extremity comprising an elongated envelope closed at one end and open at the other, said envelope having inner and outer members defining an elongated substantially annular space therebetween, and adapted to fit about the body extremity with said inner member in contact with said body extremity to surround the same and extend longitudinally thereof with negligible pressure thereon, each of said inner and outer envelope members being a non-elastic, flexible fabric coated on one side with an air impermeable substance, and means for admitting fluid under pressure to the space between said members and alternately releasing the same to intermittently contact said inner member and produce a radially inwardly directed pressure against said body extremity, said annular space being continuous and uninterrupted and embracing substantially the entire body extremity to apply a uniform pressure simultaneously on all portions thereof including the free end of said extremity, said envelope being in the form of a garment closed at one end and open at the other end for receiving a limb including the extremity thereof, said inner and outer members being hermetically joined together for the entire circumference at both the open and the closed ends thereof and being hermetically joined together longitudinally between said end joints.

2. The structure defined in claim 1 in which said hermetic joints are cemented and seamed.

3. The structure as defined in claim 1 in which said inner member is of a circumferential dimension greater than said outer member.

4. The structure defined in claim 1 in which said inner and outer members are longitudinally split for the full length with one longitudinal margin of said inner member cemented and stitched to the corresponding margin of the outer member to form a first longitudinal edge and the other longitudinal margin of said inner member is cemented and stitched to the corresponding other margin of the outer member to form a second longitudinal edge, said second longitudinal edge overlapping for a considerable distance said first longitudinal edge, and a connecting strip joining said overlapping second edge with said overlapped outer member.

5. Means for stimulating flow within an animal body extremity comprising an elongated envelope having inner and outer members defining an elongated substantially annular space therebetween and adapted to fit about the body extremity with said inner member in contact with said body extremity to surround the same and extend longitudinally thereof with negligible pressure thereon, each of said inner and outer envelope members being a non-elastic, flexible fabric coated on one side with an air impermeable substance, and means for admitting fluid under pressure to the space between said members and alternately releasing the same to intermittently contact said inner member and produce a radially inwardly directed pressure against said body extremity, said annular space being continuous and uninterruped and embracing substantially the entire body extremity to apply a uniform pressure simultaneously on all portions thereof including the free end of said extremity, said envelope being in the form of a legging open at the top and closed at the foot, said inner and outer members being hermetically joined together longitudinally of the envelope along the front thereof from the upper end continuously across the toe and along the bottom of the foot, terminating at the heel.

References Cited in the file of this patent

UNITED STATES PATENTS

| | | |
|---|---|---|
| 1,795,893 | Rossett | Mar. 10, 1931 |
| 2,694,395 | Brown | Nov. 16, 1954 |
| 2,832,336 | Davis | Apr. 29, 1958 |
| 2,834,340 | Walter | May 13, 1958 |
| 3,034,501 | Hewson | May 15, 1962 |

FOREIGN PATENTS

| | | |
|---|---|---|
| 840,452 | France | Jan. 16, 1939 |
| 549,294 | Great Britain | Nov. 13, 1942 |
| 443,601 | Italy | Dec. 29, 1948 |